US006919947B2

(12) United States Patent
Kwok et al.

(10) Patent No.: US 6,919,947 B2
(45) Date of Patent: Jul. 19, 2005

(54) COLOR VERTICALLY ALIGNED LIQUID CRYSTAL DISPLAYS

(75) Inventors: Hoi-Sing Kwok, Clear Water Bay (HK); Xing-Jie Yu, Clear Water Bay (HK)

(73) Assignee: The Hong Kong University of Science and Technology, Kowloon (HK)

( * ) Notice: Subject to any disclaimer, the term of this patent is extended or adjusted under 35 U.S.C. 154(b) by 31 days.

(21) Appl. No.: 10/722,548

(22) Filed: Nov. 28, 2003

(65) Prior Publication Data

US 2005/0117101 A1 Jun. 2, 2005

(51) Int. Cl.[7] .......................................... G02F 1/1337
(52) U.S. Cl. ..................................... 349/130; 349/178
(58) Field of Search ................................. 349/130, 178

(56) References Cited

U.S. PATENT DOCUMENTS

| | | | | |
|---|---|---|---|---|
| 6,108,064 A | * | 8/2000 | Minoura et al. | 349/130 |
| 6,507,381 B1 | * | 1/2003 | Katsuya et al. | 349/130 |
| 2002/0097362 A1 | * | 7/2002 | Yamada et al. | 349/130 |

* cited by examiner

*Primary Examiner*—Kenneth Parker
*Assistant Examiner*—(Nancy) Thanh-Nhan P Nguyen
(74) *Attorney, Agent, or Firm*—Burns, Doane, Swecker & Mathis, L.L.P.

(57) ABSTRACT

The present invention relates to color liquid crystal displays without the use of color filters. By using vertically aligned liquid crystal display cells, it is possible to obtain vivid colors from the display as a function of the operating voltage, with a bright background that can be gray or colored.

9 Claims, 5 Drawing Sheets

Figure 6A

COLOR VERTICALLY ALIGNED LIQUID CRYSTAL DISPLAYS

FIELD OF THE INVENTION

This invention relates to color liquid crystal displays.

BACKGROUND OF THE INVENTION

Color liquid crystal displays (LCD) are usually made by putting color filters onto the individual pixels. These color filters are resins with color pigments. Full color displays can be made by a combination of the red, green and blue primary colors. This coloring scheme is the predominant technology for active matrix as well as passive matrix LCDs currently in use. Many colors can be obtained.

For many applications, multiple colors rather than a full range of colors may be sufficient. This is especially true for low cost products not requiring full video displays. There have been several proposals to produce a color effect without the use of color filters. The advantages of colors without color filters are many, the most important one being cost and ease of manufacturing. Yamaguchi et al, Yamaguchi et al and Yang et al teach the generation of color by the addition of a birefringent film inside the LCD. The birefringence color is due to the interference effect and dispersion effect of the transmission of the LC cell. While most of the attention is concentrated on the supertwisted nematic (STN) display with a twist angle of larger than 180°, there is nevertheless a need for similar techniques for low twist angles.

SUMMARY OF THE INVENTION

The present invention, at least in preferred forms, provides the use of a vertically aligned liquid crystal cell to obtain vivid colors in a low twist LCD without the use of color filters. The vertical alignment allows for the voltage off state to be very bright. It can also be colored depending on the polarizer angles. By turning on the voltage, the display will show various colors. Such displays have many applications in situations requiring only a few colors without gray scales. Examples are watches and clocks that can change colors, electronic games, etc. The present invention can be both reflective as well as transflective in nature, and is simple to produce.

BRIEF DESCRIPTION OF THE DRAWINGS

Some embodiments of the present invention will now be described by way of example and with reference to the accompanying drawings, in which.

DETAILED DESCRIPTION OF THE PREFERRED EMBODIMENTS

Figure 1:
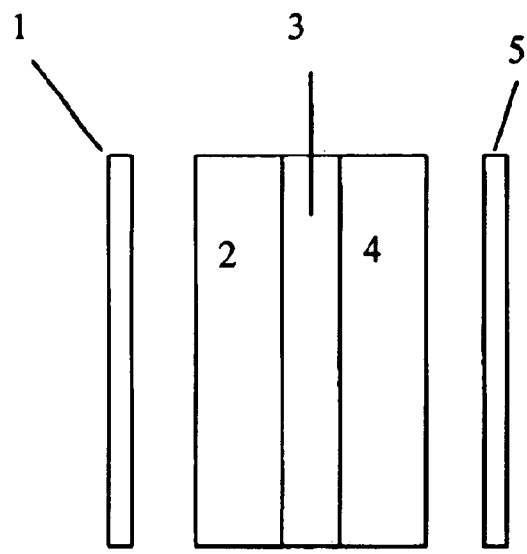
FIG. 1 is the schematic diagram of a transmittive LCD cell.
Figure 2:
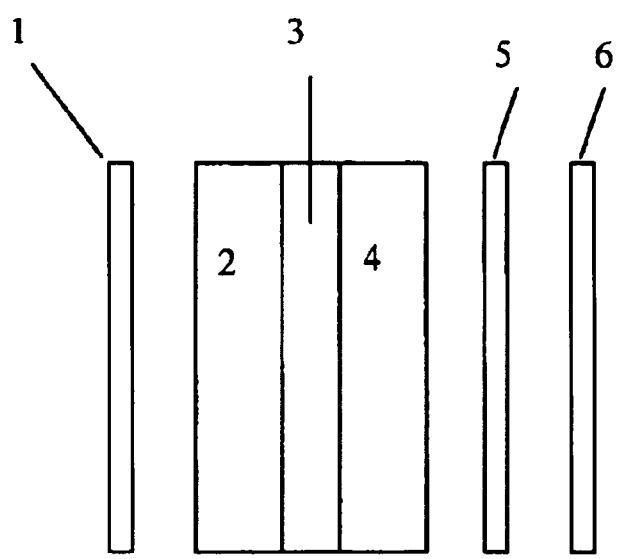
FIG. 2 is the schematic diagram of a transflective LCD cell.
Figure 3:
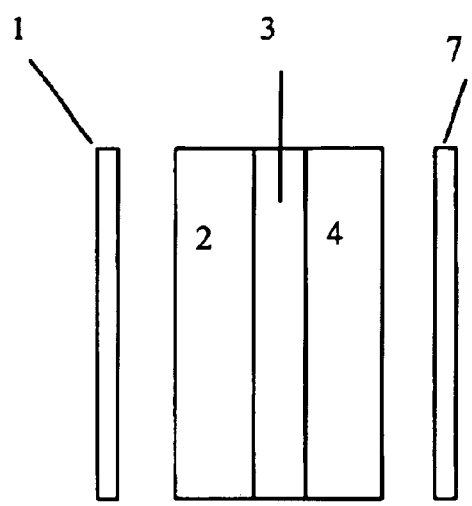
FIG. 3 is the schematic diagram of a reflective LCD cell.

A liquid crystal display is composed of a liquid crystal layer 3 and a front polarizer 1. The liquid crystal layer is held between two pieces of glass 2 and 4. On these glasses, there can be conductive transparent electrodes, alignment layers and other coatings necessary for making the display. For a transmittive display, a rear polarizer 5 is added as shown in FIG. 1. For the case of a transflective display, a diffusive reflector 6 can also be added as shown in FIG. 2. In the case of a single polarizer reflective display, the rear polarizer 5 is eliminated as shown in FIG. 3. A special reflector 7 which does not produce any depolarization effect will then have to be used.

Figure 4:
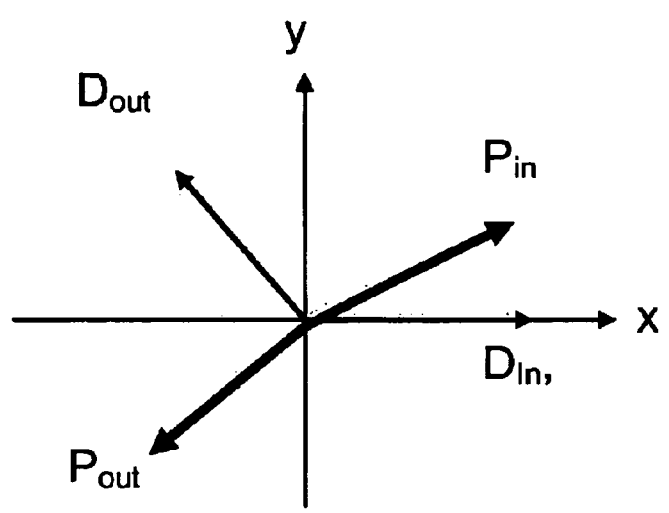
FIG. 4 is the schematic diagram of the various directions and vectors of a LCD cell projected on the x-y plane.

The transmission or reflection properties of a LCD is completely characterized by its input polarizer angle $\alpha$, the cell gap d—birefringence $\Delta n$ product, $d\Delta n$, the twist angle of the liquid crystal $\phi$, and the output polarizer angle $\gamma$. All these angles are measured relative to the input director of the LCD cell which is defined as the x-axis. The various directions inside a LC cell are shown in FIG. 4. The twist angle $\phi$ is the angle between the input and output directors. The input and output polarizers are at angles relative to the input director.

By varying the set of values ($\alpha$, $\gamma$, $\phi$, $d\Delta n$) one can obtain any color for the display at the no voltage bias V=0 state. The transmission spectrum is simply given by the Jones matrix calculation $$T = \left| \begin{pmatrix} \cos\gamma & \sin\gamma \end{pmatrix} \cdot M_{LC} \cdot \begin{pmatrix} \cos\alpha \\ \sin\alpha \end{pmatrix} \right|^2 \text{ where} \quad (1)$$

$$M_{LC} = \begin{pmatrix} A - iB & -C - iD \\ C - iD & A + iB \end{pmatrix} \text{ and} \quad (2)$$

$$A = \cos\phi\cos\chi + \frac{\phi}{\chi}\sin\phi\sin\chi \quad (3)$$

$$B = \frac{\delta}{\chi}\cos\phi\sin\chi \quad (4)$$

$$C = \sin\phi\cos\chi - \frac{\phi}{\chi}\cos\phi\sin\chi \quad (5)$$

$$D = \frac{\delta}{\chi}\sin\phi\sin\chi \quad (6)$$

and $$\chi = (\delta^2 + \phi^2)^{1/2} \quad (7)$$

$$\delta = \pi d \Delta n / \lambda \quad (8)$$

$$\Delta n = n_c(\theta) - n_o \quad (9)$$

where $\lambda$ is the wavelength

In obtaining color from an LCD, it is necessary to calculate the transmission or reflection spectra of the LCD as a function of the applied voltage on the LC cell. This requires the calculation of the deformation of the liquid crystal director arrangement by solving the Euler-Lagrange equations:

$$2k_1\ddot{\theta} + \frac{dk_1(\theta)}{d\theta}\dot{\theta}^2 - \frac{dk_2(\theta)}{d\theta}\dot{\phi}^2 - \frac{dk_3}{d\theta}\dot{\phi} - D^2 \frac{d}{d\theta}\left(\frac{1}{\varepsilon_{zz}(\theta)}\right) = 0$$

$$2k_2\dot{\phi} + k_3 = \text{constant}$$

where $\theta$ and $\phi$ are the angles defining the director of the liquid crystal molecules, and D is related to the voltage V applied to the LCD by:

$$V = -D \int_0^d \frac{dz}{\varepsilon_{zz}(\theta(z))}$$

To obtain the conditions of the LCD that will provide the best color and contrast without the use of any color filters, an extensive calculation of the behavior of the LCD is performed. One important class of LCD is the vertically aligned VAN mode. This mode has the property that without any applied voltage, there is little or no retardation in the LC cell so that it can be very bright if the input and output polarizers are aligned properly. As well, the background color of the LCD can be chosen by arranging the polarizer angle properly.

In the optimization procedure, the deformation of the liquid crystal alignment is calculated as a function of applied voltage. Then the transmission spectra are calculated as a function of the applied voltage. The results are evaluated in terms of its colors. Finally, several modes where the color changes are vividly obtained as a function of applied voltage are recorded.

For the case of the single polarizer reflective display, the reflectivity is given by $$R = \left| (\cos\alpha \quad \sin\alpha) \cdot R_\phi M_{LC}^* R_\phi^{-1} M_{LC} \cdot \begin{pmatrix} \cos\alpha \\ \sin\alpha \end{pmatrix} \right|^2$$

where the transformation matrix R is given by $$R_\phi = \begin{pmatrix} \cos\phi & -\sin\phi \\ \sin\phi & \cos\phi \end{pmatrix}$$

The same procedure of varying ($\alpha$, $\phi$, $d\Delta n$) to find the best combination with the best colors can be performed as in the transmittive display. For the reflective display, the search is simpler because of the reduction of one variable. All the new combinations of ($\alpha$, $\phi$, $d\Delta n$) are recorded here as our inventions.

In preferred embodiments of this invention, several combinations of ($\alpha$, $\gamma$, $\phi$, $d\Delta n$) are provided for the case of transmittive displays and ($\alpha$, $\phi$, $d\Delta n$) for the case of reflective displays that will give colors to liquid crystal displays without any color filters. These colors can be tuned by applying the proper voltages to the LC cell.

The preferred embodiments are values of ($\alpha$, $\gamma$, $\phi$, $d\Delta n$) for obtaining vivid color LCD without using color filters. In these embodiments of the invention, the liquid crystal is of the negative anisotropy type and has a vertical alignment, so that the birefringence increases when a voltage is applied. However, the liquid crystal layer 3 is such that it has a certain degree of pretilt, which is obtained by treating the alignment layers, which are coated on the glasses 2 and 4. The pretilt angle makes the alignment of the liquid crystal molecules to have an angle of 82°–88° instead of the perpendicular value of 90°. Additionally, the pretilt gives the liquid crystal molecules a direction in the horizontal plane. This pretilt direction determines the twist angle when a voltage is applied to the negatively anisotropic liquid crystals.

The general rules are:

$$\alpha \sim 45° + \frac{\phi}{2} + \frac{N\pi}{2}$$

$\gamma \sim \gamma$
$\phi$ can be any value
$d\Delta n \sim 1.9$ μm
Here, N can be $-1$, 0 or 1.

Figure 5:
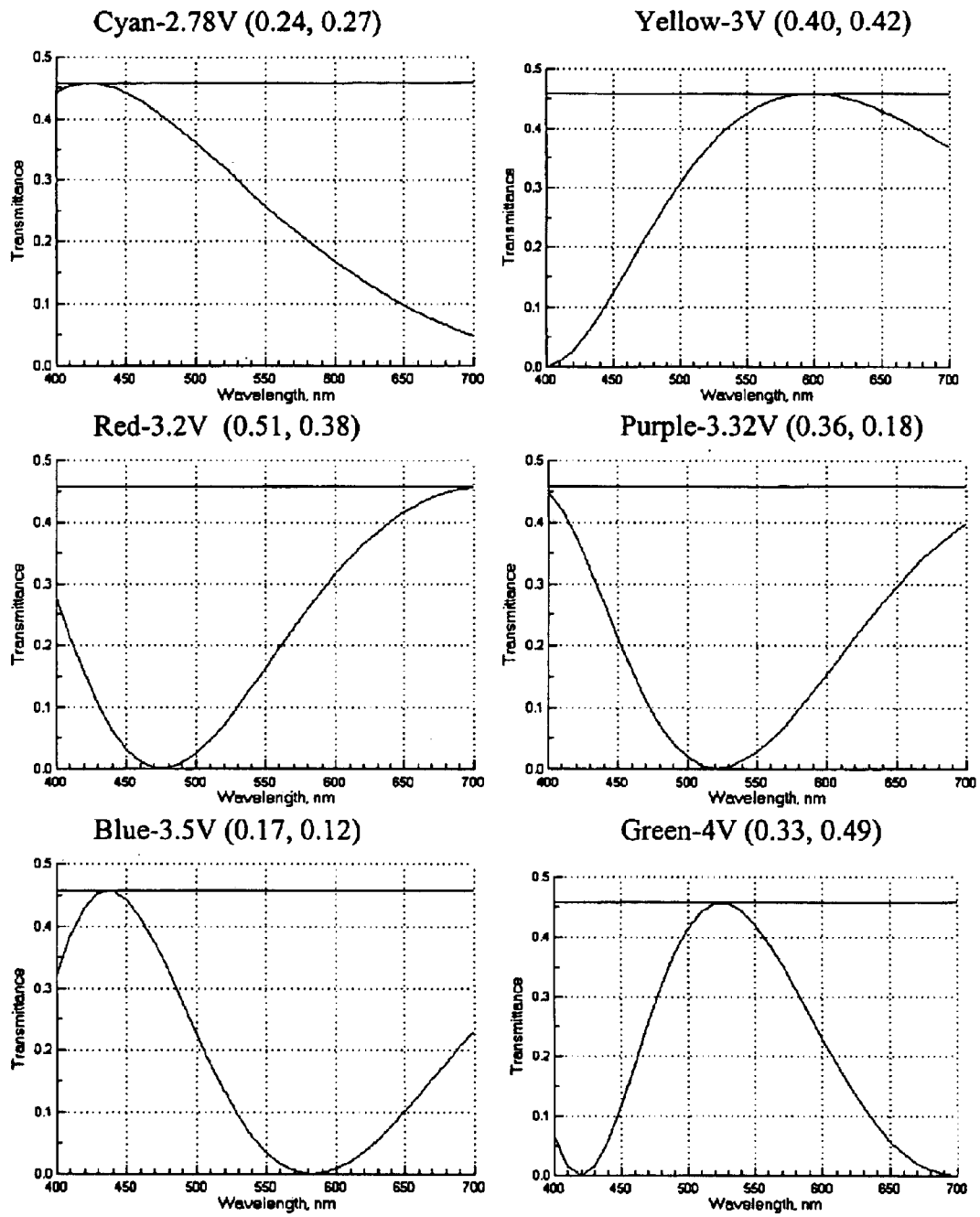
FIG. 5 is the transmission spectrum of the first and third preferred embodiments of the present invention.

In the first preferred embodiment of this invention, the twist angle is set to be 5°. The polarizer angles are at 45°. The transmission spectra are calculated for this display as a function of the applied voltage. FIG. 5 shows the transmission spectra of this first preferred embodiment. In this figure, the applied voltages are shown, together with the color of the display. The CIE color coordinates are also shown as well. It can be seen that many colors can be obtained. The background of the display is white or gray. Thus the color contrast of this display is great.

Figure 6A:
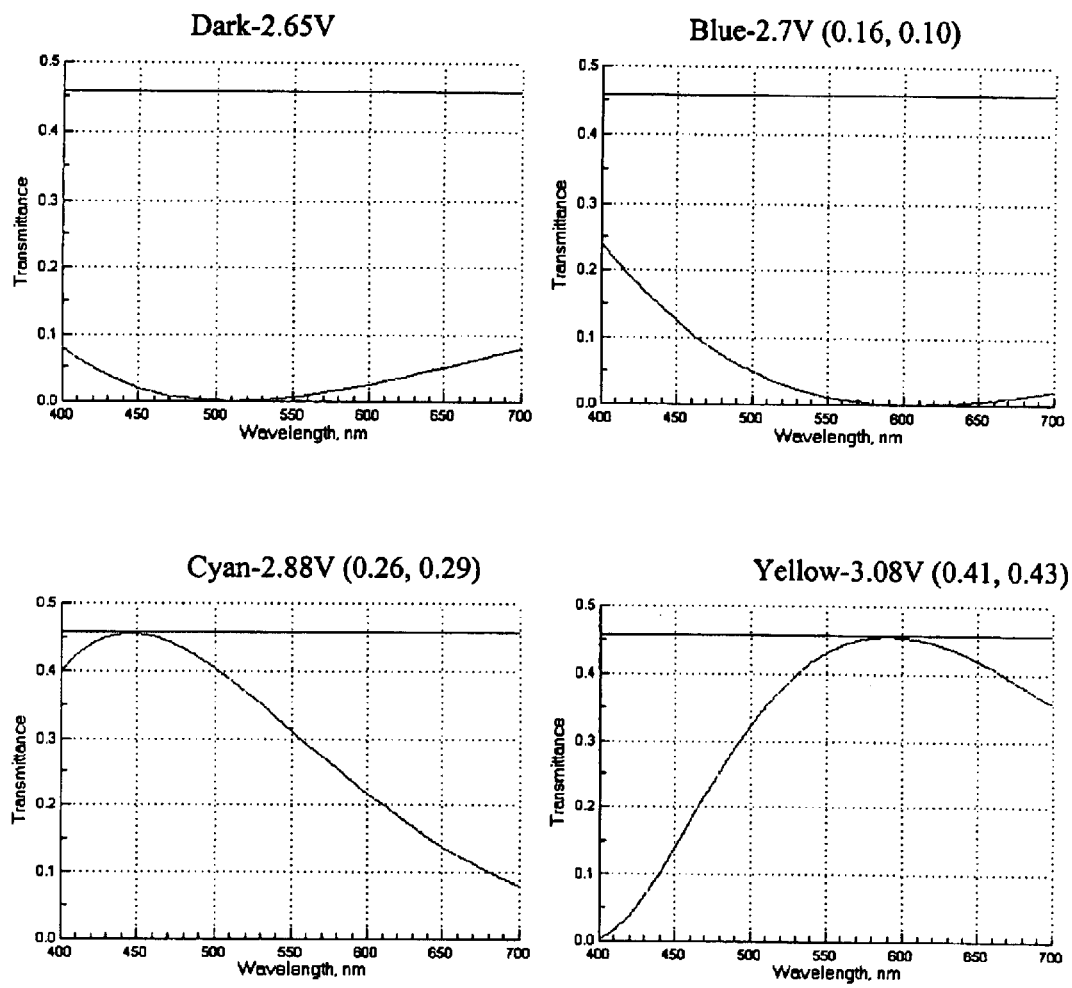
FIG. 6 is the transmission spectrum of the second and fourth preferred embodiments of the present invention.
Figure 6B:
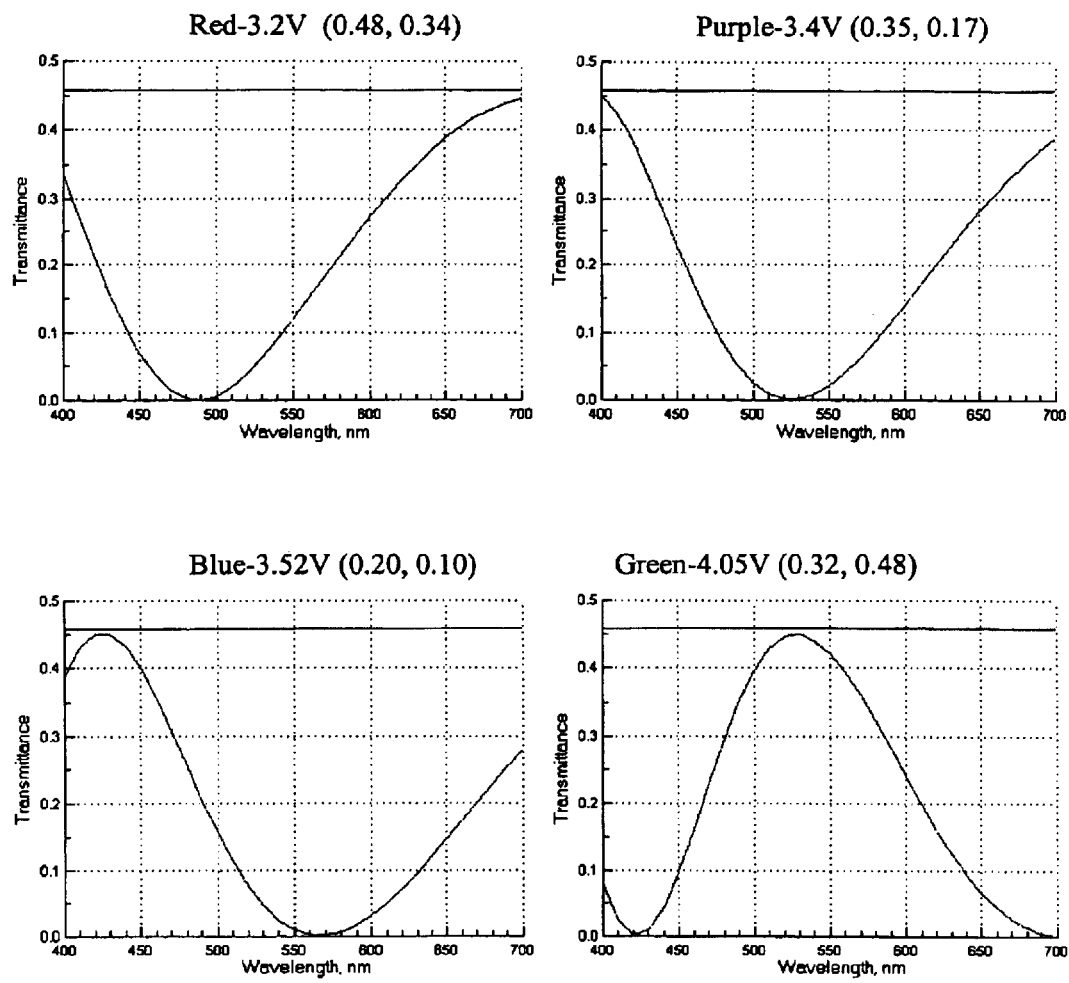

In the second preferred embodiment of this invention, the twist angle is set to be 90°. The polarizer angles are set to be 0°. FIG. 6 shows the transmission spectra of this second preferred embodiment. The transmission spectra are calculated for this display as a function of the applied voltage. In that figure, the applied voltages are shown, together with the color of the display. The CIE color coordinates are also shown as well. It can be seen that many colors can be obtained. The background of the display is white or gray. Thus the color contrast of this display is great.

In the third preferred embodiment of the present invention, the display is of a reflective type with only one polarizer. The configuration is as shown in FIG. 4. The values of the various parameters are the same as in the first preferred embodiment, except that the cell gap-birefringence product is halved, at 0.95 μm. The output spectra as a function of applied voltages are similar to the case of the first embodiment, except that the voltages needed are lower due to the thinner cell gap.

In the fourth preferred embodiment of the present invention, the display is of a reflective type with only one polarizer. The configuration is as shown in FIG. 4. The values of the various parameters are the same as in the second preferred embodiment, except that the cell gap-birefringence product is halved, at 0.95 μm. The output spectra as a function of applied voltages are similar to the case of the first embodiment, except that the voltages needed are lower due to the thinner cell gap.

What is claimed is:

1. A liquid crystal display comprising an input polarizer, an output polarizer, and a liquid crystal cell in between said input and output polarizers characterized by a twist angle, a cell thickness and a birefringence of the liquid crystal, such that:

(a) the liquid crystal has a negative dielectric anisotropy,
   (b) the alignment of the liquid crystal in the zero volt state is substantially vertical and perpendicular to the liquid crystal cell,
   (c) the liquid crystal cell is treated such that there is a pretilt angle of the liquid crystal molecules near the cell surfaces away from the vertical direction, and thus has a vectorial component on the plane of the liquid crystal cell (the x-y plane),
   (d) the said pretilt angles of the liquid crystal molecules gives rise to a preferred twist angle of value $\phi$, where $\phi$ can be any value, as viewed on the x-y plane,
   (e) the input polarizer angle $\alpha$ has a value of $\xi-\phi/2+N\pi/2$ relative to the tilt direction of the input director of the said liquid crystal cell on the x-y plane, where ξ has a value of between 35° and 55° and N has a value of either −1, 0 or 1, (f) the output polarizer angle γ has a value of between α−10° and α+10° on the x-y plane, and (g) the product of the cell gap d and birefringence Δn has a value of between 1.0 and 2.2 microns.

2. A liquid crystal display comprising an input polarizer, an output polarizer, and a liquid crystal cell in between said input and output polarizers characterized by a twist angle, a cell thickness and a birefringence of the liquid crystal, such that:

(a) the liquid crystal has a negative dielectric anisotropy, (b) the alignment of the liquid crystal in the zero volt state is substantially vertical and perpendicular to the liquid crystal cell, (c) the liquid crystal cell is treated such that there is a pretilt angle of the liquid crystal molecules near the cell surfaces away from the vertical direction, and thus has a vectorial component on the plane of the liquid crystal cell (the x-y plane), (d) the said pretilt angles of the liquid crystal molecules gives rise to a preferred twist angle of less than 45° as viewed on the x-y plane, (e) the input polarizer angle α is between 35° and 55° relative to the tilt direction of the input director of the said liquid crystal cell on the x-y plane, (f) the output polarizer angle γ is between 35° and 55° relative to the tilt direction of the input director of the said liquid crystal cell on the x-y plane, and (g) the product of the cell gap d and birefringence Δn has a value of between 1.0 and 2.2 microns.

3. A liquid crystal display as claimed in claim 2 wherein the twist angle has a value of between −10° and 10°.

4. A liquid crystal display comprising an input polarizer, an output polarizer, and a liquid crystal cell in between said input and output polarizers characterized by a twist angle, a cell thickness and a birefringence of the liquid crystal, such that:

(a) the liquid crystal has a negative dielectric anisotropy, (b) the alignment of the liquid crystal in the zero volt state is substantially vertical and perpendicular to the liquid crystal cell, (c) the liquid crystal cell is treated such that there is a pretilt angle of the liquid crystal molecules near the cell surfaces away from the vertical direction, and thus has a vectorial component on the plane of the liquid crystal cell (the x-y plane), (d) the pretilt angle of the liquid crystal molecules gives rise to a preferred twist angle of larger than 45° as viewed on the x-y plane, (e) the input polarizer angle α is between −10° and 10° relative to the tilt direction of the input director of the said liquid crystal cell on the x-y plane, (f) the output polarizer angle γ is between −10° and 10° relative to the tilt direction of the input director of the said liquid crystal cell on the x-y plane, and (g) the product of the cell gap d and birefringence Δn has a value of between 1.0 and 2.2 microns.

5. A liquid crystal display as claimed in claim 4 wherein the twist angle has a value of between 80° and 100°.

6. A liquid crystal display comprising an input polarizer, a rear reflector, and a liquid crystal cell in between said input and rear reflector characterized by a twist angle, a cell thickness and a birefringence of the liquid crystal, such that:

(a) the liquid crystal used has a negative dielectric anisotropy, (b) the alignment of the liquid crystal in the zero volt state is substantially vertical and perpendicular to the liquid crystal cell, (c) the liquid crystal cell is treated such that there is a pretilt angle of the liquid crystal molecules near the cell surfaces away from the vertical direction, and thus has a vectorial component on the plane of the liquid crystal cell (the x-y plane), (d) the pretilt angles of the liquid crystal molecules gives rise to a preferred twist angle of less than 45° as viewed on the x-y plane, (e) the input polarizer angle α is between 35° and 55° relative to the tilt direction of the input director of the said liquid crystal cell on the x-y plane, and (f) the product of the cell gap d and birefringence αn has a value of between 0.5 and 1.1 micron.

7. A liquid crystal display as claimed in claim 6 wherein the twist angle has a value of between −10° and 10°.

8. A liquid crystal display comprising an input polarizer, a rear reflector, and a liquid crystal cell in between said input and rear reflector characterized by a twist angle, a cell thickness and a birefringence of the liquid crystal, such that:

(a) the liquid crystal used has a negative dielectric anisotropy, (b) the alignment of the liquid crystal in the zero volt state is substantially vertical and perpendicular to the liquid crystal cell, (c) the liquid crystal cell is treated such that there is a pretilt angle of the liquid crystal molecules near the cell surfaces away from the vertical direction, and thus has a vectorial component on the plane of the liquid crystal cell (the x-y plane), (d) the pretilt angles of the liquid crystal molecules gives rise to a preferred twist angle of larger than 45° as viewed on the x-y plane, (e) the input polarizer angle α is between −10° and 10° relative to the tilt direction of the input director of the said liquid crystal cell on the x-y plane, and (f) the product of the cell gap d and birefringence Δn has a value of between 0.5 and 1.1 microns.

9. A liquid crystal display as claimed in claim 8 wherein the twist angle has a value of between 80° and 100°.

* * * * *

UNITED STATES PATENT AND TRADEMARK OFFICE
CERTIFICATE OF CORRECTION

PATENT NO. : 6,919,947 B2
DATED : July 19, 2005
INVENTOR(S) : Hoi-Sing Kwok et al.

It is certified that error appears in the above-identified patent and that said Letters Patent is hereby corrected as shown below:

Column 4,
Lines 1-10, after "The general rules are:" should be changed to the following:

- $\alpha \sim 45° + \dfrac{\phi}{2} + \dfrac{N\pi}{2}$

- $\gamma \sim \alpha$

- $\phi$ can be any value

- $d\Delta n \sim 1.9 \mu m$

Here, $N$ can be $-1$, $0$ or $1$.

Signed and Sealed this

Eighth Day of November, 2005

JON W. DUDAS
*Director of the United States Patent and Trademark Office*